(12) United States Patent
Yamana et al.

(10) Patent No.: US 10,174,909 B2
(45) Date of Patent: Jan. 8, 2019

(54) OPTICAL MEMBER AND MICROLENS ARRAY

(71) Applicant: Panasonic Intellectual Property Management Co., Ltd., Osaka (JP)

(72) Inventors: Masahito Yamana, Hyogo (JP); Shintaro Hayashi, Hyogo (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 15/765,261

(22) PCT Filed: Oct. 6, 2016

(86) PCT No.: PCT/JP2016/004499
§ 371 (c)(1),
(2) Date: Mar. 31, 2018

(87) PCT Pub. No.: WO2017/061119
PCT Pub. Date: Apr. 13, 2017

(65) Prior Publication Data
US 2018/0283651 A1 Oct. 4, 2018

(30) Foreign Application Priority Data
Oct. 9, 2015 (JP) .................................. 2015-201562

(51) Int. Cl.
*F21V 5/04* (2006.01)
*F21V 9/30* (2018.01)
(Continued)

(52) U.S. Cl.
CPC ................ *F21V 5/04* (2013.01); *F21V 5/007* (2013.01); *F21V 9/30* (2018.02); *G02B 3/08* (2013.01);
(Continued)

(58) Field of Classification Search
CPC .......... G02B 3/08; G02B 5/18; G02B 5/1876; F21V 5/04
(Continued)

(56) References Cited

U.S. PATENT DOCUMENTS

| 5,257,132 A | 10/1993 | Ceglio et al. |
| 5,978,139 A | 11/1999 | Hatakoshi |

(Continued)

FOREIGN PATENT DOCUMENTS

| JP | 59-231738 | 12/1984 |
| JP | 10-92002 | 4/1998 |

(Continued)

OTHER PUBLICATIONS

An extended European search report dated Sep. 27, 2018 issued for the corresponding European patent application No. 16853275.2.
(Continued)

*Primary Examiner* — Karabi Guharay
(74) *Attorney, Agent, or Firm* — Renner, Otto, Boisselle & Sklar, LLP

(57) ABSTRACT

An optical member includes: a phosphor layer including a phosphor that converts a wavelength of a portion of light from a light source which is incident on an incidence face; and a microlens array that causes the portion of light wavelength-converted by the phosphor layer and the other portion of light transmitted through the phosphor layer to emerge from an emission face, in which a diffractive lens array for diffracting the portion of light wavelength-converted and the other portion of light transmitted is provided on the emission face of the microlens array, and a pitch of the diffractive lens array is different for each of predetermined sections.

11 Claims, 9 Drawing Sheets

(51) Int. Cl.
  *G02B 3/08*    (2006.01)
  *G02B 5/18*    (2006.01)
  *G02B 5/20*    (2006.01)
  *F21V 5/00*    (2018.01)
  *F21Y 115/10*  (2016.01)

(52) U.S. Cl.
  CPC ............ *G02B 5/18* (2013.01); *G02B 5/1876* (2013.01); *G02B 5/20* (2013.01); *F21Y 2115/10* (2016.08)

(58) Field of Classification Search
  USPC .......................................................... 362/84
  See application file for complete search history.

(56) References Cited

U.S. PATENT DOCUMENTS

| | | | |
|---|---|---|---|
| 6,407,860 B1 | 6/2002 | Funazaki | |
| 2007/0127125 A1 | 6/2007 | Sasaki | |
| 2011/0025190 A1 | 2/2011 | Jagt | |
| 2012/0134132 A1 | 5/2012 | Park et al. | |
| 2013/0010454 A1 | 1/2013 | Takayama | |
| 2013/0050978 A1* | 2/2013 | Suzuki | G02B 3/08 362/84 |
| 2013/0242568 A1 | 9/2013 | Asai | |
| 2014/0084325 A1 | 3/2014 | Yamanaka | |
| 2014/0204592 A1 | 7/2014 | Miyashita | |

FOREIGN PATENT DOCUMENTS

| | | |
|---|---|---|
| JP | 2000-171613 | 6/2000 |
| JP | 2006-024378 | 1/2006 |
| JP | 2008-305802 | 12/2008 |
| JP | 2011-515846 | 5/2011 |
| JP | 2011-171086 | 9/2011 |
| JP | 2011-186350 | 9/2011 |
| JP | 2012-123371 | 6/2012 |
| JP | 2012-209142 | 10/2012 |
| JP | 2013-105942 | 5/2013 |
| JP | 2013-137985 | 7/2013 |
| JP | 2013-229145 | 11/2013 |
| WO | 2009/116458 | 9/2009 |
| WO | 2010/140419 | 12/2010 |
| WO | 2013/008361 | 1/2013 |
| WO | 2013/024836 | 2/2013 |

OTHER PUBLICATIONS

Taiwanese Office Action dated Aug. 30, 2018 for corresponding Taiwan Patent Application No. 105132303.
International Search Report (ISR) and Written Opinion (WO) dated Dec. 27, 2016 in International (PCT) Application No. PCT/JP2016/004499.

* cited by examiner

|  | COMPARATIVE EXAMPLE 1 | EXAMPLE 1 |
|---|---|---|
| CROSS-SECTIONAL SHAPE | SAWTOOTH SHAPE | SAWTOOTH SHAPE |
| PITCH | SAME | DIFFERENT |
| HEIGHT [μm] | 0.9 | 0.9 |
| RELATIVE VALUE OF FOCUSING EFFICIENCY | 1.00 | 4.54 |

|  | COMPARATIVE EXAMPLE 2 | EXAMPLE 2 |
|---|---|---|
| CROSS-SECTIONAL SHAPE | SAWTOOTH SHAPE | SAWTOOTH SHAPE |
| PITCH | SAME | DIFFERENT |
| HEIGHT [μm] | 1.2 | 1.2 |
| RELATIVE VALUE OF FOCUSING EFFICIENCY | 1.00 | 4.54 |

|  | COMPARATIVE EXAMPLE 3 | EXAMPLE 3 |
|---|---|---|
| CROSS-SECTIONAL SHAPE | SAWTOOTH SHAPE | SAWTOOTH SHAPE |
| PITCH | SAME | DIFFERENT |
| RELATIVE VALUE OF FOCUSING EFFICIENCY | 1.00 | 8.61 |

OPTICAL MEMBER AND MICROLENS ARRAY

TECHNICAL FIELD

The present invention relates to an optical member and a microlens array.

BACKGROUND ART

There are lights which use a light emitting diode (LED) or a laser. In such lights, white light is created by irradiating phosphor with blue light emitted by the LED or the laser. Specifically, the phosphor scatters light such as the blue light irradiating the phosphor and yellow light resulting from excitation by the blue light, thereby enabling the production of white light. The white light from the phosphor is controlled by a combination of a collimator lens and a condenser lens.

On the other hand, in such lights, a portion of white light from the phosphor, which has a large emission angle, is lost without being incident on the collimator lens. Moreover, the loss of light increases when the collimator lens and the condenser lens are misaligned.

In view of this, a technique capable of reducing such a loss of light has been disclosed (for example, Patent Literature 1). According to Patent Literature 1, an optical component with a lens array including micro lenses or micro prisms is disposed on phosphor, to thereby enable white light from the phosphor which has a large emission angle to be incident on a condenser lens (projector lens).

CITATION LIST

Patent Literature

PTL 1: Japanese Unexamined Patent Application Publication No. 2008-305802

SUMMARY OF THE INVENTION

Technical Problems

With the above-described background art, however, it is difficult to sufficiently focus the white light from the phosphor. As such, a condenser lens is needed. Moreover, even if the condenser lens is provided, there is a loss of light when the collimator lens is misaligned.

The present invention is conceived in view of the above-described problems and has an object to provide an optical member and a microlens array which are capable of enhancing the efficiency of focusing the light from a phosphor.

Solutions to Problems

In order to achieve the above-described object, an optical member according to an aspect of the present invention includes: a phosphor layer including a phosphor that converts a wavelength of a portion of light from a light source which is incident on an incidence face of the phosphor layer; and a diffractive microlens array that causes the portion of light wavelength-converted by the phosphor layer and the other portion of light transmitted through the phosphor layer to emerge from an emission face of the microlens array, in which diffractive lenses for diffracting the portion of light wavelength-converted and the other portion of light transmitted are provided on the emission face of the microlens array, and a pitch of the diffractive lenses is different for each of predetermined sections.

Moreover, in order to achieve the above-described object, a microlens array according to an aspect of the present invention is a diffractive microlens array that causes a portion of light wavelength-converted by a phosphor layer and the other portion of light transmitted through the phosphor layer to emerge from an emission face of the microlens array, the phosphor layer including a phosphor that converts a wavelength of the portion of light from a light source which is incident on an incidence face of the phosphor layer, in which diffractive lenses for diffracting the portion of light wavelength-converted and the other portion of light transmitted are provided on the emission face, and a pitch of the diffractive lenses is different for each of predetermined sections.

Advantageous Effects of Invention

According to the optical member according to an aspect of the present invention, it is possible to enhance the efficiency of focusing the light from a phosphor.

Moreover, according to the microlens array according to an aspect of the present invention, it is possible to enhance the efficiency of focusing the light from a phosphor.

DESCRIPTION OF EXEMPLARY EMBODIMENT

Hereinafter, embodiments will be described with reference to the drawings. Each of the embodiments described herein show a specific example of the present invention. Therefore, numerical values, shapes, materials, structural components, the arrangement and connection of the structural components, steps (processes), the sequence of the steps, etc. shown in the following embodiments are mere examples, and are not intended to limit the scope of the present invention. Among the structural components in the following embodiments, components not recited in the independent claims are described as structural components that can be arbitrarily added. Furthermore, the respective figures are schematic diagrams and are not necessarily precise illustrations.

Embodiment

[Lighting Apparatus]

Firstly, an example of a lighting apparatus including an optical member according to the present embodiment will be described.

Figure 1:
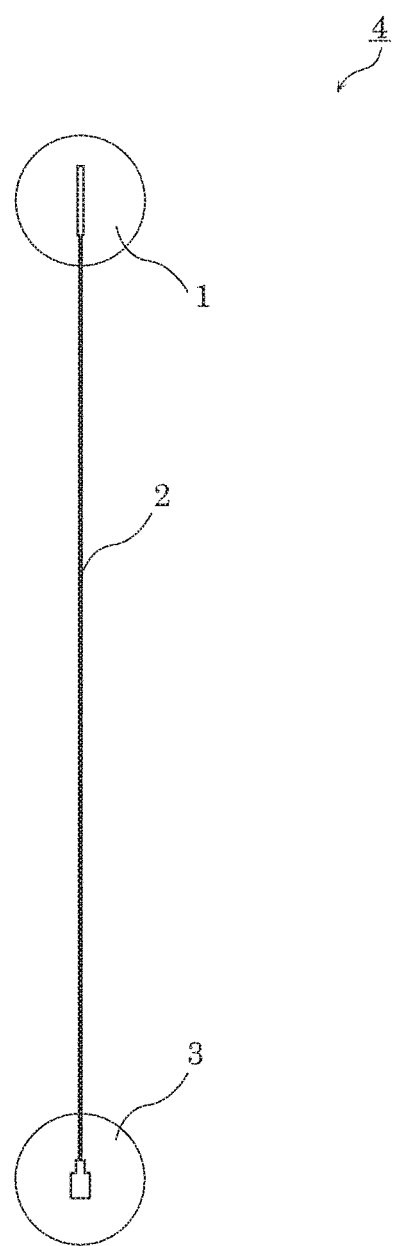
FIG. 1 is a diagram illustrating an example of an apparatus in which an optical member according to an embodiment is used.
Figure 2:
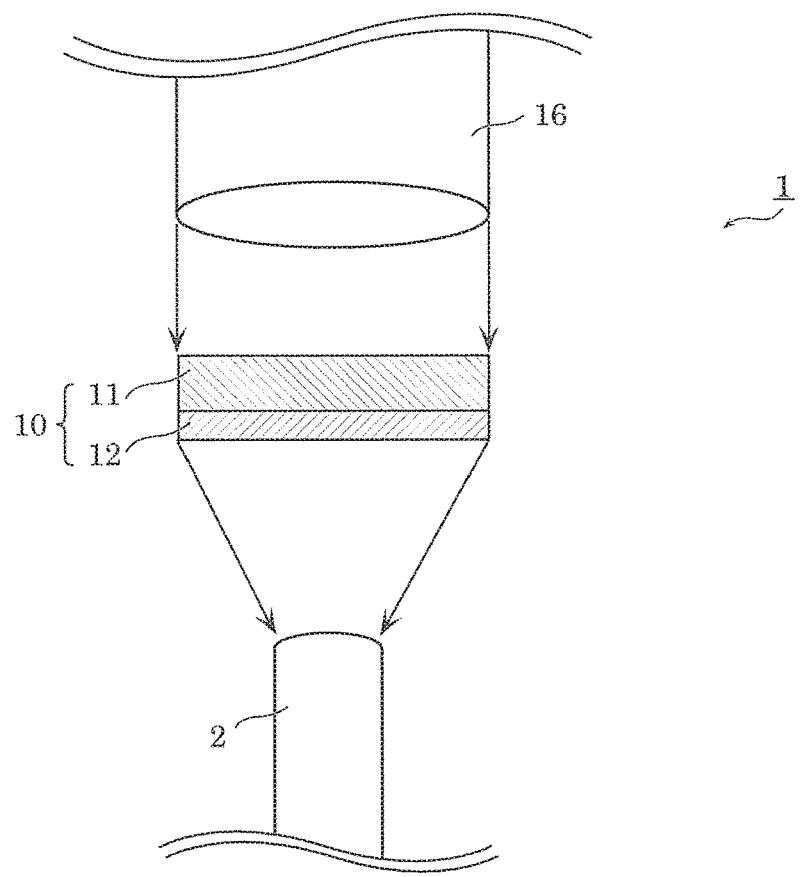
FIG. 2 is a diagram illustrating an example of a light source according to the embodiment.
Figure 3:
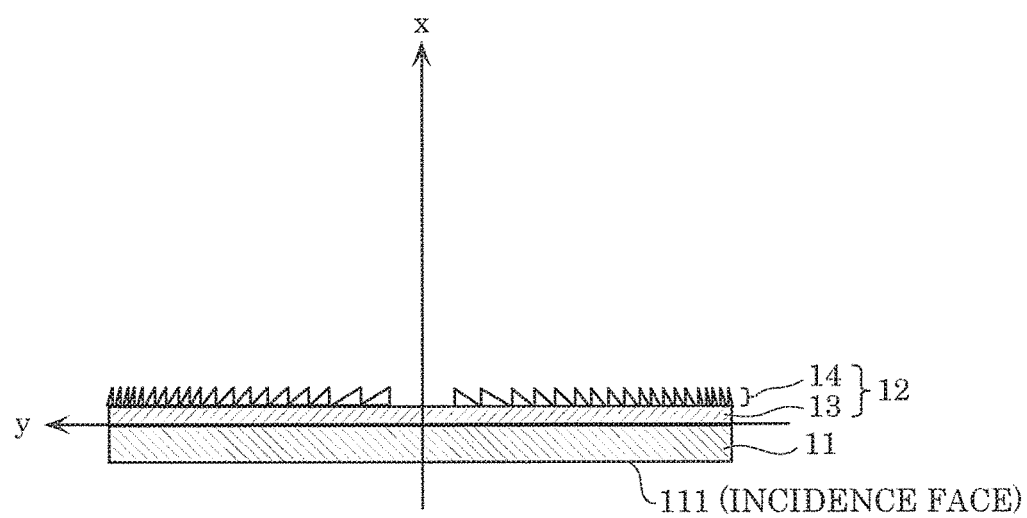
FIG. 3 is an example of a cross-sectional view of the optical member according to the embodiment.
Figure 4:
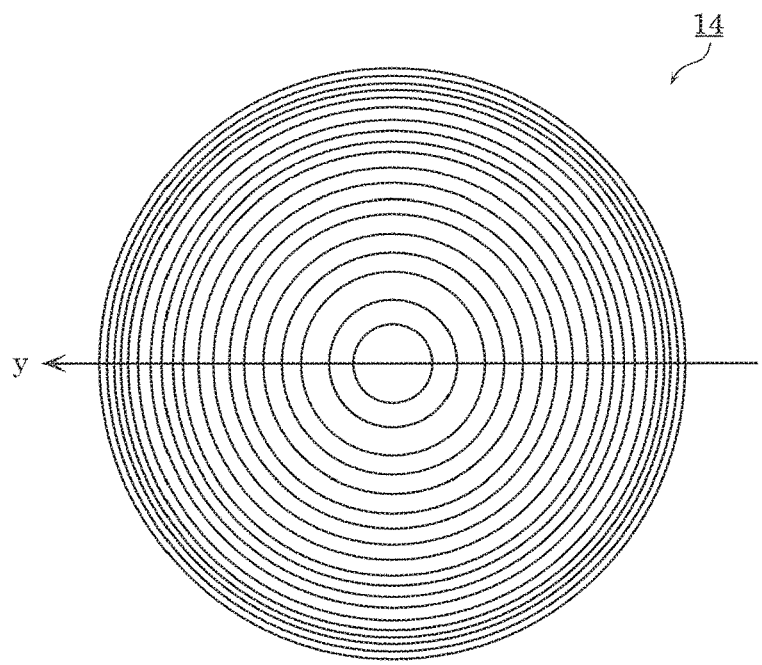
FIG. 4 is a top view of the optical member illustrated in FIG. 3.

FIG. 1 is a diagram illustrating an example of lighting apparatus 4 in which optical member 10 according to the embodiment is used. FIG. 2 is a diagram illustrating an example of light source unit 1 according to the embodiment. FIG. 3 is an example of the cross-sectional view of optical member 10 according to the embodiment. FIG. 4 is an example of the top view of optical member 10 illustrated in FIG. 3.

Lighting apparatus 4 illustrated in FIG. 1 is for example an endoscope or a fiberscope, and includes light source unit 1, optical fiber 2, and lighting component 3.

Optical fiber 2 is a transmission path for transmitting light over a distance. Optical fiber 2 is for example a linear component having a diameter of approximately 125 μm, and has a two-part structure consisting of a core that has a high refractive index and a diameter of approximately 100 μm and a cladding layer that surrounds the core and has a lower refractive index than the core and a diameter of approximately 110 μm. Both the core and the cladding layer are made of quartz glass or plastic having extremely high light transmissivity.

Lighting component 3 is used for irradiating an observation target with light transmitted from light source unit 1 via optical fiber 2. Lighting component 3 includes, for example, a stainless steel fiber coupling, a stainless steel ferrule, one or more glass lens, an aluminum holder, and an aluminum outer hull.

Light source unit 1 is a light using a LED or a laser, and provides light to optical fiber 2. As illustrated in FIG. 2, light source unit 1 includes optical member 10 and light source 16.

Light source 16 is a LED or a laser, and emits blue light having a diameter of approximately 1 mm in the present embodiment.

Although described in detail below, as illustrated in FIG. 2, optical member 10 includes phosphor layer 11 and microlens array 12, and creates white light from blue light emitted by light source 16 to provide the created white light to optical fiber 2. Microlens array 12 is a diffractive microlens array that causes a portion of light wavelength-converted by phosphor layer 11 and the other portion of light transmitted through phosphor layer 11 to emerge from an emission face of the diffractive microlens array. In the present embodiment, microlens array 12 includes base material 13 and diffractive lens array 14 as illustrated in FIG. 3 for example.

[Optical Member]

Next, the details of the optical member according to the present embodiment will be described with reference to FIG. 3 to FIG. 7.

(Phosphor Layer 11)

Phosphor layer 11 includes a phosphor which converts a wavelength of a portion of light from light source 16 which is incident on incidence face 111 of phosphor layer 11. Here, for example, light source 16 emits blue light, and phosphor layer 11 converts a wavelength of a portion of the blue light into a wavelength in a wavelength range representing yellow light.

More specifically, phosphor layer 11 has a function of wavelength-converting a portion of light incident on incidence face 111 as illustrated in FIG. 3. In the present embodiment, for example, blue light from light source 16 is incident on phosphor layer 11, and phosphor layer 11 emits yellow light resulting from excitation by a portion of the incident blue light. Moreover, the other portion of the incident blue light passes (transmits) through phosphor layer 11. The blue light and the yellow light are mixed before emerging from phosphor layer 11, and thus white light emerges from phosphor layer 11.

Phosphor layer 11 is formed in a disc shape having a diameter of approximately 1 mm. Phosphor layer 11 includes a phosphor and a resin, and is formed by enclosing the phosphor with the resin such as silicon or epoxy, for example.

It should be noted that a loss of light during wavelength conversion is transformed to heat. Since wavelength conversion efficiency of phosphor layer 11 deteriorates with increasing temperature, heat dissipation of phosphor layer 11 is very important. Although not particularly illustrated in the figures, phosphor layer 11 may be supported by a heat-dissipating plate formed using a material having high thermal conductivity such as Al. Moreover, heat dissipation may be enhanced by mixing the resin forming phosphor layer 11 with a material having high thermal conductivity, e.g., an inorganic oxide such as ZnO. Moreover, minute structures may be provided in incidence face 111 of phosphor layer 11 to facilitate entry of light to phosphor layer 11 or to facilitate heat dissipation from incidence face 111.

(Base Material 13)

Base material 13 is a base material of microlens array 12. In the present embodiment, as illustrated in FIG. 3 for example, base material 13 is formed, for example, in a disc shape having a diameter of approximately 1 mm. And, diffractive lens array 14 is formed on base material 13.

Any material such as glass or plastic can be used for the material forming base material 13. Here, as glass, it is possible to use, for example, soda glass, non-alkali glass, etc. Moreover, as plastic, it is possible to use, for example, polycarbonate, polyethylene terephthalate (PET), polyethylene naphthalate (PEN), etc.

It should be noted that the material of base material 13 needs to be selected with consideration to thermal resistance as described in the foregoing section (Phosphor layer 11). Moreover, base material 13 may be formed from a material having a similar refractive index as phosphor layer 11 to facilitate entry of light from phosphor layer 11. Here, the similar refractive index means that the refractive index difference between phosphor layer 11 and base material 13 is ±0.2 or less. Moreover, although not particularly illustrated in the figures, it is preferable that phosphor layer 11 and base material 13 are bonded together by an adhesive layer having a similar refractive index as both phosphor layer 11 and base material 13. The material of the adhesive layer includes an acryl resin, an epoxy resin, etc. Moreover, base material 13 and the adhesive layer may be transparent with no light absorption, and may be formed from a material having a substantially 0 extinction coefficient.

(Diffractive Lens Array 14)

As illustrated in FIG. 3 for example, diffractive lens array 14 is an example of diffractive lenses provided on the emission face of microlens array 12. Diffractive lens array 14 causes a portion of light wavelength-converted by phosphor layer 11 and the other portion of light transmitted through phosphor layer 11 to emerge from the emission face of diffractive microlens array 14. The pitch of diffractive lens array 14 is different for each of predetermined sections (zones). Moreover, the pitch of diffractive lens array 14 decreases from the center of diffractive lens array 14 toward the edge of diffractive lens array 14. It should be noted that in the example illustrated in FIG. 3, the center of diffractive lens array 14 is indicated by the intersection of the x-axis and the y-axis. Moreover, the direction from the center of diffractive lens array 14 toward the edge of diffractive lens array 14 is indicated by the direction along the y-axis heading away from the x-axis.

In the present embodiment, as illustrated in FIG. 4 for example, diffractive lens array 14 is described as being provided on the emission face in a concentric circular shape, and as illustrated in FIG. 3 for example, the cross-section of the diffractive lenses taken along a plane perpendicular to the emission face is described as being sawtooth-shaped.

Figure 5:
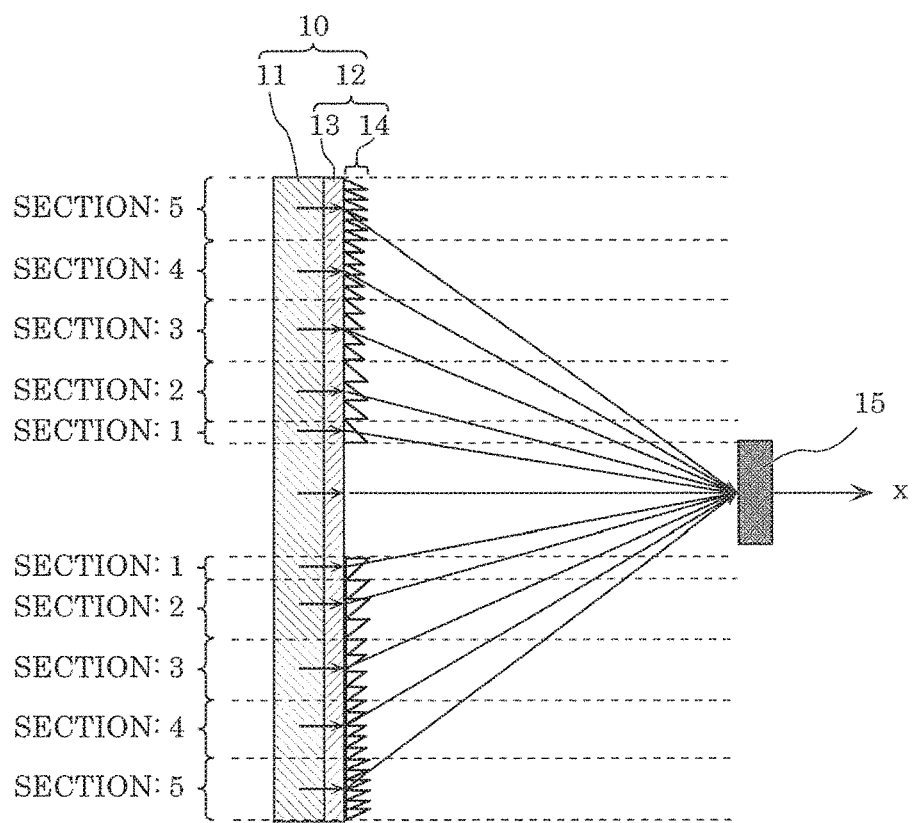
FIG. 5 is a cross-sectional view of the optical member according to the embodiment.

FIG. 5 is a diagram illustrating diffraction of light incident on microlens array 12 according to the present embodiment. In FIG. 5, as an example of the predetermined sections, five concentric circular sections (Section 1, Section 2, Section 3, Section 4, and Section 5) are shown except the center section in which the diffractive lenses are not provided.

As illustrated in FIG. 5 for example, diffractive lens array 14 (diffractive lenses) is provided such that the blue light from light source 16 and the yellow light resulting from wavelength conversion of blue light in phosphor layer 11 are diffracted to focus on focusing region 15 which is a predetermined region.

More specifically, the pitch of diffractive lens array 14 is set to be constant in each of the predetermined sections to diffract a wavelength-converted portion of light or the other portion of light to focus on the predetermined region (focusing region 15). In the example illustrated in FIG. 5, the pitch of diffractive lens array 14 is constant in each of Sections 1 to 5. Moreover, the pitch of diffractive lens array 14 decreases as the section (zone) gets closer to the edge of diffractive lens array 14 from the center of diffractive lens array 14, i.e. the pitch is smaller in Section 2 than in Section 1, in Section 3 than in Section 2, and the like.

Here, even when the pitch of diffractive lens array 14 is set to focus a portion of light, i.e. the blue light for example, diffractive lens array 14 enables a large portion of the yellow light resulting from the wavelength conversion in phosphor layer 11 to be diffracted to focus on focusing region 15. Thus, as the result, diffractive lens array 14 enables the blue light transmitted through phosphor layer 11 and the yellow light resulting from the wavelength conversion in phosphor layer 11, i.e. white light, to be diffracted to focus on focusing region 15. In the same manner, even when the pitch of diffractive lenses is set to focus part of the other portion of light, i.e. the yellow light resulting from the wavelength conversion in phosphor layer 11 for example, diffractive lens array 14 enables a large portion of the blue light transmitted through phosphor layer 11 to be diffracted to focus on focusing region 15. Thus, as the result, diffractive lens array 14 enables the blue light transmitted through phosphor layer 11 and the yellow light resulting from the wavelength conversion in phosphor layer 11, i.e. white light, to be diffracted to focus on focusing region 15.

It should be noted that the pitch of the diffractive lenses belonging to some of the predetermined sections may be set to be constant in each of the some of the predetermined sections to diffract the other portion of light which is in a wavelength range of light source 16 to focus on a predetermined region (focusing region 15), and the pitch of the diffractive lenses belonging to rest of the predetermined sections may be set to be constant in each of the rest of the predetermined sections to diffract the wavelength-converted portion of light to focus on the predetermined region (focusing region 15). In the example illustrated in FIG. 5, the pitch in some of Sections 1 to 5 is set to focus part of the other portion of light, i.e. the yellow light resulting from the wavelength conversion in phosphor layer 11, and the pitch in the rest of Sections 1 to 5 is set to focus the portion of light, i.e. the blue light. While the pitch of diffractive lens array 14 is constant in each of Section 1, Section 2, Section 3, Section 4, and Section 5, the pitch of diffractive lens array 14 decreases as the section (zone) gets closer to the edge of diffractive lens array 14 from the center of diffractive lens array 14 as described above.

With this configuration, diffractive lens array 14 enables the blue light transmitted through phosphor layer 11 and the yellow light resulting from the wavelength conversion of blue light in phosphor layer 11, i.e. white light, to be diffracted to focus on focusing region 15.

Next, the method of calculating the above-mentioned pitch of diffractive lens array 14 will be described.

Emergent angle $\theta_2$ for each of the diffractive lenses included in diffractive lens array 14 can be calculated according to Equation 1 which is known as a diffraction equation, using parameters such as incident angle $\theta_1$, wavelength $\lambda$, pitch d, refractive index $n_1$ of the microlens array:

$$n_1 \sin \theta_1 + (m\lambda)/d = n_2 \sin \theta_2 \qquad \text{(Equation 1)}$$

where m is the order of diffraction which is a positive or negative integer. In addition, $n_2$ is the refractive index in a region into which light emerges through the diffractive lenses. In this case, $n_2$ is 1 since the region is air.

For example, when it is desired to focus the light incident on microlens array 12 illustrated in FIG. 5 onto focusing region 15, emergent angle $\theta_2$ can be determined based on the geometric positional relationship between focusing region 15 and incident angle $\theta_1$ which is an angle of light incident on each of the diffractive lenses. In this manner, pitch d can be calculated using Equation 1.

In the present embodiment, for each of Sections 1 to 5, emergent angle $\theta_2$ is determined based on the geometric positional relationship between focusing region 15 and incident angle $\theta_1$, and thus it is possible to calculate pitch d of diffractive lens array 14 in each of Sections 1 to 5.

Although a specific example of the calculation result will be described later, pitch d can be calculated to be for example at least 0.2 μm and at most 20 μm as a pitch range in which light focuses on focusing region 15 by being diffracted.

It should be noted that the material of diffractive lens array 14 is selected according to the forming method, thermal resistance, and refractive index of diffractive lens array 14. Methods of forming diffractive lens array 14 include nanoimprinting, printing, photolithography, EB lithography, particle orientation, etc.

For the material of diffractive lens array 14, it is sufficient to select an epoxy resin, an acrylic resin, etc., as a UV curing resin, or polymethyl methacrylate (PMMA), etc., as a thermoplastic resin, when diffractive lens array 14 is to be formed by nanoimprinting or printing, for example. Moreover, taking thermal resistance into consideration, glass or quartz may be selected for the material of diffractive lens array 14, and diffractive lens array 14 may be formed by photolithography or EB lithography.

Moreover, diffractive lens array 14 may be formed using a material having a similar refractive index as base material 13 to facilitate entry of light from base material 13. Furthermore, like base material 13, diffractive lens array 14 may be transparent with no light absorption, and may be formed from a material having a substantially 0 extinction coefficient.

(Optical Simulation of Optical Member)

In order to check the effect of optical member 10 having the configuration as described above, optical simulation is performed while changing the pitch of diffractive lens array 14 for each of the predetermined sections (zones). The example will be described below. It should be noted that parameters for determining the focusing efficiency (diffraction efficiency) of diffractive lens array 14 (microlens array 12) include the height, cross-sectional shape, etc., of diffractive lens array 14 (microlens array 12). This focusing efficiency can be known from the optical simulation without actually making microlens array 12.

EXAMPLE 1

Figures 6, 7:
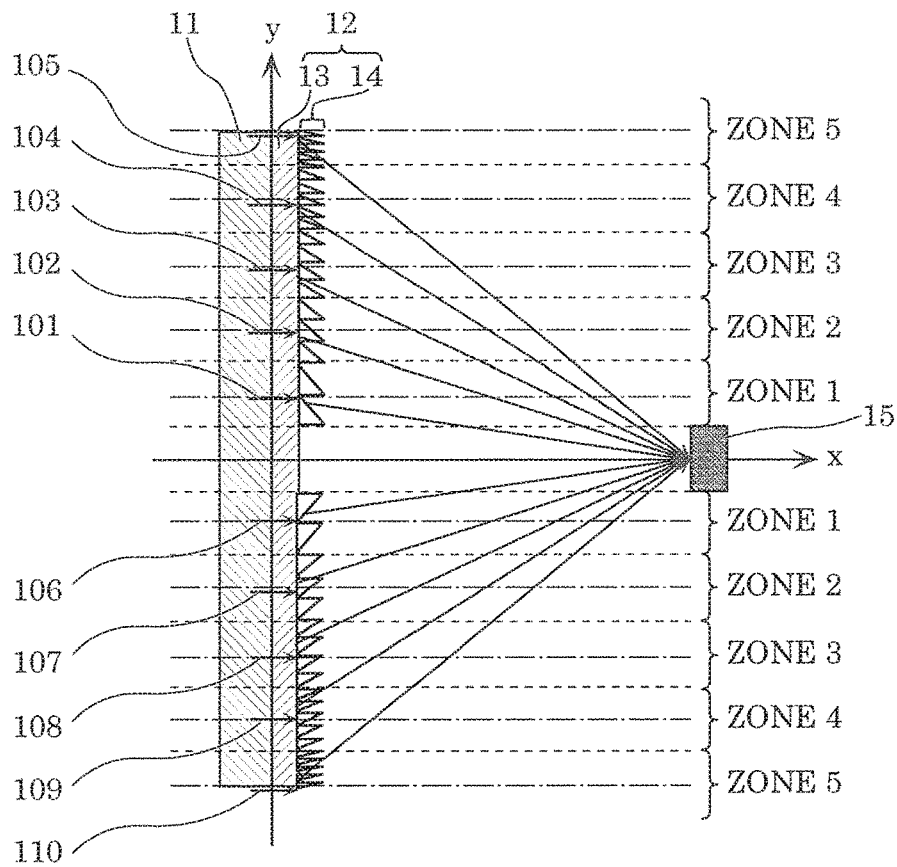
FIG. 6 is a diagram for describing a simulation model according to example 1.
FIG. 7 is a diagram illustrating a result of simulation according to example 1.
Figures 8, 9:
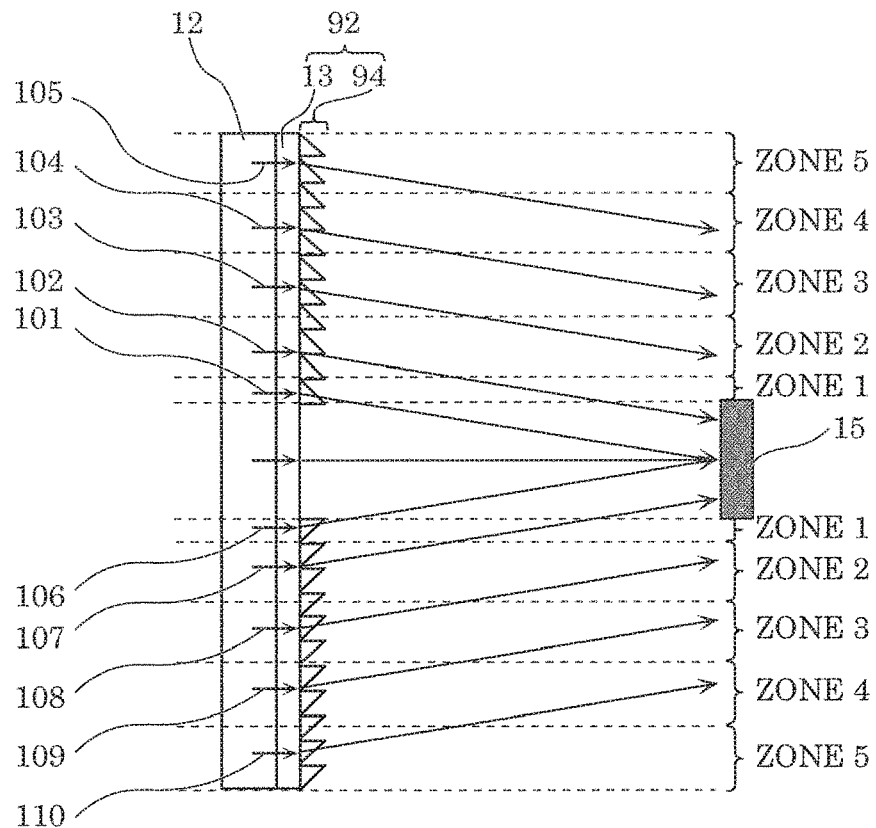
FIG. 8 is a diagram schematically illustrating a result of simulation according to comparative example 1.
FIG. 9 is a diagram illustrating a result of simulation according to example 2.

FIG. 6 is a diagram for describing a simulation model according to Example 1. FIG. 7 is a diagram illustrating a result of simulation according to example 1. FIG. 8 is a diagram schematically illustrating a result of simulation according to Comparative example 1.

FIG. 6 illustrates a simulation model of optical member 10 illustrated in FIG. 5. In the simulation model illustrated in FIG. 6, microlens array 12 is disposed on phosphor layer 11, and focusing region 15 is provided at a predetermined distance away from microlens array 12. Incident light rays 101 to 110 are models of light incident on the respective sections (referred to as the zones in the figure) of diffractive lens array 14 at an incident angle of 0 deg. Incident light rays 101 and 106 are models of light incident on zone 1 of diffractive lens array 14, incident light rays 102 and 107 are models of light incident on zone 2 of diffractive lens array 14, and incident light rays 103 and 108 are models of light incident on zone 3 of diffractive lens array 14. Likewise, incident light rays 104 and 109 are models of light incident on zone 4 of diffractive lens array 14, and incident light rays 105 and 110 are models of light incident on zone 5 of diffractive lens array 14.

Using the above-mentioned calculation method, an emergent angle, i.e., an angle between each of incident light rays 101 to 110 and light toward focusing region 15, is calculated from the coordinates (incident position) of each of incident light rays 101 to 110 and the coordinates of focusing region 15, and the diffraction efficiency of diffractive lens array 14 whose pitch is designed to have the calculated emergent angle is simulated.

It should be noted that in the simulation model illustrated in FIG. 6, the diffractive lenses are not formed in the area where diffractive lens array 14 and focusing region 15 overlap each other in the y-coordinate direction (the area around the intersection of the x-axis and the y-axis in this figure) since light having an incident angle of 0 deg is directly incident on focusing region 15.

Using the above-mentioned simulation model, the optical simulation has been performed under the conditions described below. The result of this simulation is illustrated in FIG. 7.

The simulation method is RCWA method. DiffractMOD (Synopsys, Inc.), design and analysis software for diffractive optical elements, is used as the simulation software. The optical simulation has been performed using the following parameters.

It is assumed that incident light rays 101 to 110 each have an incident angle of 0 deg and an incident wavelength of 450 nm, the refractive index of diffractive lens array 14 is 1.5, the extinction coefficient is 0, the diameter of focusing region 15 is 100 μm, and the distance between diffractive lens array 14 and focusing region 15 is 5.54 mm.

It is also assumed that incident light rays 101 and 106 are located at a distance of 0.1 mm from the center (y=0 in the figure) of microlens array 12, and each have an emergent angle of 1.0 deg. Pitch $d_1$ of diffractive lens array 14 in zone 1 is set to be 24.8 μm according to Equation 1.

Moreover, it is assumed that incident light rays 102 and 107 are located at a distance of 0.2 mm from the center (y=0 in the figure) of microlens array 12, and each have an emergent angle of 2.1 deg. Pitch $d_2$ of diffractive lens array 14 in zone 2 is set to be 12.4 μm according to Equation 1.

Moreover, it is assumed that incident light rays 103 and 108 are located at a distance of 0.3 mm from the center (y=0 in the figure) of microlens array 12, and each have an emergent angle of 3.1 deg. Pitch $d_3$ of diffractive lens array 14 in zone 3 is set to be 8.3 μm according to Equation 1.

Moreover, it is assumed that incident light rays 104 and 109 are located at a distance of 0.4 mm from the center (y=0 in the figure) of microlens array 12, and each have an emergent angle of 4.2 deg. Pitch $d_4$ of diffractive lens array 14 in zone 4 is set to be 6.2 μm according to Equation 1.

Moreover, it is assumed that incident light rays 105 and 110 are located at a distance of 0.5 mm from the center (y=0 in the figure) of microlens array 12, and each have an emergent angle of 5.2 deg. Pitch $d_5$ of diffractive lens array 14 in zone 5 is set to be 5 μm according to Equation 1.

It should be noted that the pitch of microlens array 92 according to Comparative example 1 is assumed to be 5 μm regardless of the locations of incident light rays 101 to 110. Moreover, the height of microlens array 12 according to this example and the height of the microlens array according to the comparative example are varied in a range of 0.2 μm to 10 μm, and the height having the most efficient diffraction is selected.

The focusing efficiency of microlens array 12 according to Example 1 as illustrated in FIG. 7 is 4.54 which is a relative value when the focusing efficiency of the microlens array according to Comparative example 1 is regarded as 1. From the simulation result illustrated in FIG. 7, it is found that the focusing efficiency of microlens array 12 according to Example 1 exceeds the focusing efficiency of the microlens array according to Comparative example 1.

Accordingly, as can be seen from the diffraction of light incident on microlens array 92 according to Comparative example 1 illustrated in FIG. 8, the pitch of diffractive lens array 94 in microlens array 92 according to Comparative example 1 is constant, and thus it is difficult to sufficiently focus the light from phosphor layer 11 onto focusing region 15. On the other hand, the pitch of diffractive lens array 14 in microlens array 12 according to Example 1 is different for each of the predetermined sections (Zones 1 to 5), and thus it is possible to sufficiently focus the light from phosphor layer 11 onto focusing region 15.

EXAMPLE 2

Example 1 shows the result of the simulation when the microlens array is designed to focus the light having an incident wavelength of 450 nm, i.e., the blue light emitted from light source 16 and transmitted through phosphor layer 11, onto focusing region 15, but not limited to this. In Example 2, the simulation model illustrated in FIG. 6 is used, and a result of the simulation when the microlens array is designed to focus the light having an incident wavelength of 550 nm, i.e., the yellow light wavelength-converted by phosphor layer 11, onto focusing region 15 is described.

FIG. 9 is a diagram illustrating a result of the simulation according to Example 2.

In other words, the simulation model, simulation method, and simulation software described in Example 1 are used to perform the optical simulation using the following parameters. The result of this simulation is illustrated in FIG. 9.

It is assumed that incident light rays 101 to 110 each have an incident angle of 0 deg and an incident wavelength of 550 nm, the refractive index of diffractive lens array 14 is 1.5, the extinction coefficient is 0, the diameter of focusing region 15 is 100 μm, and the distance between diffractive lens array 14 and focusing region 15 is 5.54 mm.

It is also assumed that incident light rays 101 and 106 are located at a distance of 0.1 mm from the center (y=0 in the figure) of microlens array 12, and each have an emergent angle of 1.0 deg. Pitch $d_1$ of diffractive lens array 14 in zone 1 is set to be 30.5 μm according to Equation 1.

Moreover, it is assumed that incident light rays 102 and 107 are located at a distance of 0.2 mm from the center (y=0 in the figure) of microlens array 12, and each have an emergent angle of 2.1 deg. Pitch $d_2$ of diffractive lens array 14 in zone 2 is set to be 15.2 μm according to Equation 1.

Moreover, it is assumed that incident light rays 103 and 108 are located at a distance of 0.3 mm from the center (y=0 in the figure) of microlens array 12, and each have an emergent angle of 3.1 deg. Pitch $d_3$ of diffractive lens array 14 in zone 3 is set to be 10.2 μm according to Equation 1.

Moreover, it is assumed that incident light rays 104 and 109 are located at a distance of 0.4 mm from the center (y=0 in the figure) of microlens array 12, and each have an emergent angle of 4.2 deg. Pitch $d_4$ of diffractive lens array 14 in zone 4 is set to be 7.6 μm according to Equation 1.

Moreover, it is assumed that incident light rays 105 and 110 are located at a distance of 0.5 mm from the center (y=0 in the figure) of microlens array 12, and each have an emergent angle of 5.2 deg. Pitch $d_5$ of diffractive lens array 14 in zone 5 is set to be 6.1 μm according to Equation 1.

It should be noted that the pitch of the microlens array according to Comparative example 2 is assumed to be 6.1 μm regardless of the locations of incident light rays 101 to 110. Moreover, the height of microlens array 12 according to this example and the height of the microlens array according to Comparative example 2 are varied in a range of 0.5 μm to 1.5 μm, and the height having the most efficient diffraction is selected.

The focusing efficiency of microlens array 12 according to Example 2 as illustrated in FIG. 9 is 4.54 which is a relative value when the focusing efficiency of the microlens array according to Comparative example 2 is regarded as 1. From the simulation result illustrated in FIG. 9, it is found that the focusing efficiency of microlens array 12 according to Example 2 exceeds the focusing efficiency of the microlens array according to Comparative example 2.

EXAMPLE 3

Example 1 and Example 2 each show the result of the simulation when the microlens array is designed to focus the light having an incident wavelength of 450 nm, i.e., the blue light emitted from light source 16 and transmitted through phosphor layer 11, or the light having an incident wavelength of 550 nm, i.e., the yellow light wavelength-converted by phosphor layer 11, onto focusing region 15, but not limited to this. In example 3, a result of simulation when the microlens array is designed to focus the light having an incident wavelength of 450 nm or the light having an incident wavelength of 550 nm, onto focusing region 15 for each of the zones (predetermined sections) is described.

Figures 10, 11:
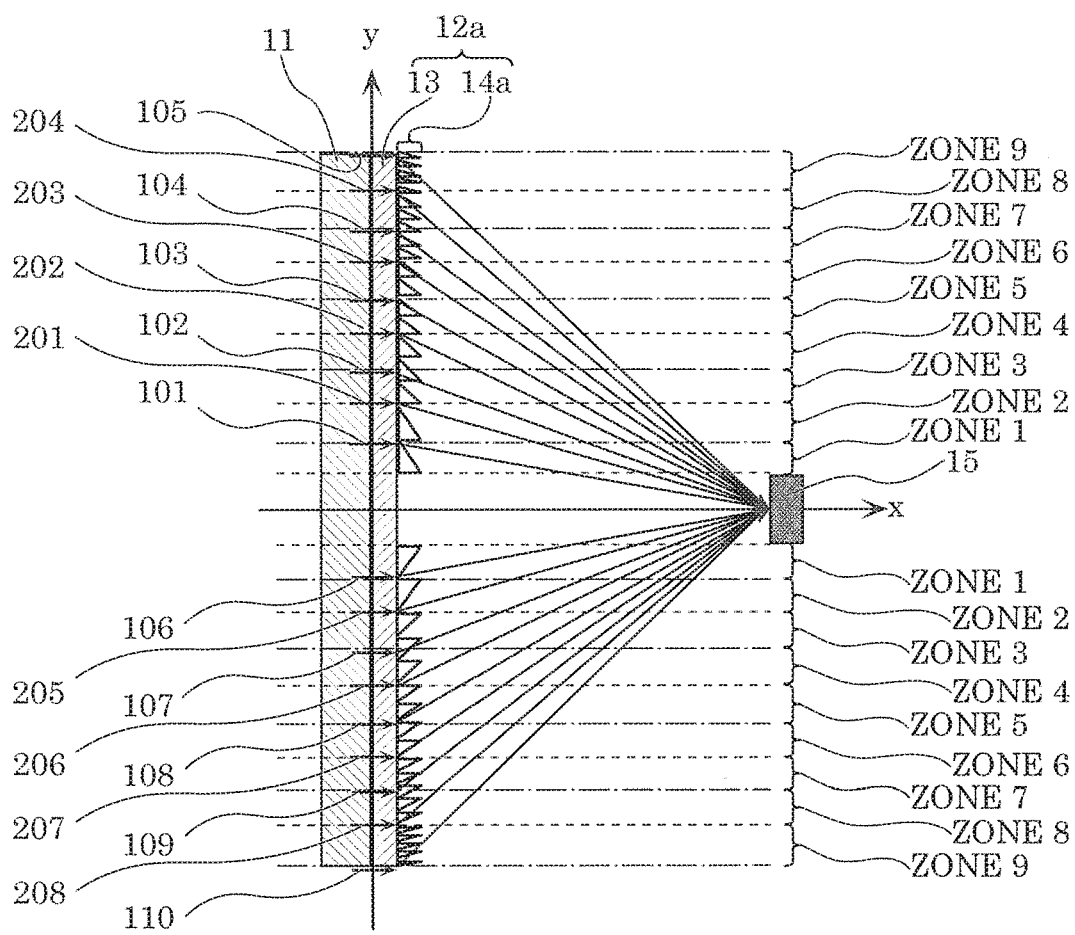
FIG. 10 is a diagram for describing a simulation model according to example 3.
FIG. 11 is a diagram illustrating a result of simulation according to example 3.

FIG. 10 is a diagram for describing a simulation model according to Example 3. FIG. 11 is a diagram illustrating a result of the simulation according to Example 3.

In FIG. 10, incident light rays 201 to 208 are added to the simulation model illustrated in FIG. 6. Specifically, in the simulation model illustrated in FIG. 10, microlens array 12a is disposed on phosphor layer 11, and focusing region 15 is provided at a predetermined distance away from microlens array 12a. Incident light rays 101 to 110 and incident light rays 201 to 208 are models of light incident on the respective sections (referred to as the zones in the figure) of diffractive lens array 14a at an incident angle of 0 deg. Incident light rays 101 and 106 are models of light incident on zone 1 of diffractive lens array 14a, incident light rays 102 and 107 are models of light incident on zone 3 of diffractive lens array 14a, and incident light rays 103 and 108 are models of light incident on zone 5 of diffractive lens array 14a. Likewise, incident light rays 104 and 109 are models of light incident on zone 7 of diffractive lens array 14a, and incident light rays 105 and 110 are models of light incident on zone 9 of diffractive lens array 14a.

Furthermore, incident light rays 201 and 205 are models of light incident on zone 2 of diffractive lens array 14a, incident light rays 202 and 206 are models of light incident on zone 4 of diffractive lens array 14a, and incident light rays 203 and 207 are models of light incident on zone 6 of diffractive lens array 14a. Likewise, incident light rays 204 and 208 are models of light incident on zone 8 of diffractive lens array 14a.

And, the simulation model, simulation method, and simulation software described in Example 1 are used to perform the optical simulation using the following parameters. The result of this simulation is illustrated in FIG. 11.

It is assumed that incident light rays 101 to 110 each have an incident angle of 0 deg and an incident wavelength of 550 nm, the refractive index of diffractive lens array 14a is 1.5, the extinction coefficient is 0, the diameter of focusing region 15 is 100 μm, and the distance between diffractive lens array 14a and focusing region 15 is 5.54 mm.

It is assumed that incident light rays 101 to 110 each have an incident angle of 0 deg and an incident wavelength of 550 nm, and incident light rays 201 to 208 each have an incident angle of 0 deg and an incident wavelength of 450 nm. Moreover, it is assumed that the refractive index of diffractive lens array 14a is 1.5, the extinction coefficient is 0, the diameter of focusing region 15 is 100 μm, and the distance between diffractive lens array 14a and focusing region 15 is 5.54 mm.

It is also assumed that incident light rays 101 and 106 are located at a distance of 0.1 mm from the center (y=0 in the figure) of microlens array 12a, and each have an emergent angle of 1.0 deg. Pitch $d_{11}$ of diffractive lens array 14a in zone 1 is set to be 24.8 μm according to Equation 1.

Moreover, it is assumed that incident light rays 102 and 107 are located at a distance of 0.2 mm from the center (y=0 in the figure) of microlens array 12a, and each have an emergent angle of 2.1 deg. Pitch $d_{12}$ of diffractive lens array 14a in zone 3 is set to be 12.4 μm according to Equation 1.

Moreover, it is assumed that incident light rays 103 and 108 are located at a distance of 0.3 mm from the center (y=0 in the figure) of microlens array 12a, and each have an emergent angle of 3.1 deg. Pitch $d_{13}$ of diffractive lens array 14a in zone 5 is set to be 8.3 µm according to Equation 1.

Moreover, it is assumed that incident light rays 104 and 109 are located at a distance of 0.4 mm from the center (y=0 in the figure) of microlens array 12a, and each have an emergent angle of 4.2 deg. Pitch $d_{14}$ of diffractive lens array 14a in zone 7 is set to be 6.2 µm according to Equation 1.

Moreover, it is assumed that incident light rays 105 and 110 are located at a distance of 0.5 mm from the center (y=0 in the figure) of microlens array 12a, and each have an emergent angle of 5.2 deg. Pitch $d_{15}$ of diffractive lens array 14a in zone 9 is set to be 5 µm according to Equation 1.

It should be noted that the height of microlens array 12a corresponding to each of the positions of incident light rays 101 to 110 is 0.9 µm.

On the other hand, it is assumed that incident light rays 201 and 205 are located at a distance of 0.15 mm from the center (y=0 in the figure) of microlens array 12a, and each have an emergent angle of 1.6 deg. Pitch $d_{21}$ of diffractive lens array 14a in zone 2 is set to be 20.3 µm according to Equation 1.

It is also assumed that incident light rays 202 and 206 are located at a distance of 0.25 mm from the center (y=0 in the figure) of microlens array 12a, and each have an emergent angle of 2.6 deg. Pitch $d_{22}$ of diffractive lens array 14a in zone 4 is set to be 12.2 µm according to Equation 1.

Moreover, it is assumed that incident light rays 203 and 207 are located at a distance of 0.35 mm from the center (y=0 in the figure) of microlens array 12a, and each have an emergent angle of 3.6 deg. Pitch $d_{23}$ of diffractive lens array 14a in zone 6 is set to be 8.7 µm according to Equation 1.

Moreover, it is assumed that incident light rays 204 and 208 are located at a distance of 0.45 mm from the center (y=0 in the figure) of microlens array 12a, and each have an emergent angle of 4.6 deg. Pitch $d_{24}$ of diffractive lens array 14a in zone 8 is set to be 6.8 µm according to Equation 1.

It should be noted that the height of microlens array 12a corresponding to each of the positions of incident light rays 201 to 208 is 1.2 µm.

Moreover, the pitch of the microlens array according to Comparative example 3 is assumed to be 6.1 µm regardless of the locations of incident light rays 101 to 110 and incident light rays 201 to 208. Moreover, the height of the microlens array according to Comparative example 3 is varied in a range of 0.5 µm to 1.5 µm, and the height having the most efficient diffraction is selected.

The focusing efficiency of microlens array 12a according to Example 3 as illustrated in FIG. 11 is 8.61 which is a relative value when the focusing efficiency of the microlens array according to Comparative example 3 is regarded as 1. From the simulation result illustrated in FIG. 11, it is found that the focusing efficiency of microlens array 12a according to Example 3 exceeds the focusing efficiency of the microlens array according to Comparative example 3. In this manner, the pitch of diffractive lens array 14a in microlens array 12a according to Example 3 is different for each of the predetermined sections (Zones 1 to 9), and thus it is possible to sufficiently focus the light from phosphor layer 11 onto focusing region 15.

[Advantageous Effects, Etc.]

As described above, in optical member 10 and microlens array 12 according to the present embodiment, microlens array 12 having a high focusing efficiency is disposed on phosphor layer 11, and thus it is possible to enhance the efficiency of focusing the light from phosphor layer 11. Moreover, in optical member 10 and microlens array 12 according to the present embodiment, no projector lens is further needed to focus the light onto a desired region (focusing region 15). Accordingly, there is no loss due to the misalignment of the projector lens.

More specifically, microlens array 92 disclosed in Patent Literature 1 has a structure in which a specified cross-sectional shape is periodically repeated as shown in FIG. 8, for example. As such, light incident at a certain angle emerges uniformly from microlens array 92, and it is difficult to sufficiently focus the light. If a projector lens for controlling the light path is not provided, it is difficult to focus the light onto a desired region (focusing region 15). Accordingly, the focusing efficiency may further deteriorate by the loss of light due to the misalignment of the projector lens.

On the other hand, in optical member 10 and microlens array 12 according to the present embodiment, the pitch is different for each of the predetermined sections on phosphor layer 11 on the basis of a desired angle at which the light incident at a certain angle emerges. With this, the light can be focused onto the desired region (focusing region 15), and thus no projector lens is further needed. In other words, there is no loss due to the misalignment of the projector lens.

More specifically, the optical member according to an aspect of the present invention includes: phosphor layer 11 including a phosphor that converts a wavelength of a portion of light from light source 16 which is incident on an incidence face of phosphor layer 11; and diffractive microlens array 12 that causes the portion of light wavelength-converted by phosphor layer 11 and the other portion of light transmitted through phosphor layer 11 to emerge from an emission face of microlens array 12 in which diffractive lenses (diffractive lens array 14) for diffracting the portion of light wavelength-converted and the other portion of light transmitted are provided on the emission face of microlens array 12, and a pitch of the diffractive lenses (diffractive lens array 14) is different for each of predetermined sections.

With this, it is possible to achieve an optical member capable of enhancing the efficiency of focusing the light from phosphor layer 11.

Here, for example, the pitch of the diffractive lenses (diffractive lens array 14) belonging to some of the predetermined sections is set to be constant in each of the some of the predetermined sections to diffract the other portion of light which is in a wavelength range of light source 16 to focus on a predetermined region, and the pitch of the diffractive lenses belonging to rest of the predetermined sections is set to be constant in each of the rest of the predetermined sections to diffract the wavelength-converted portion of light to focus on the predetermined region.

With this, the diffractive lenses (diffractive lens array 14) enable the blue light transmitted through the phosphor layer and the yellow light resulting from the wavelength conversion in phosphor layer 11, i.e. white light, to be diffracted to focus on focusing region 15.

Moreover, for example, the pitch of the diffractive lenses (diffractive lens array 14) is set to be constant for each of the predetermined sections to diffract the portion of light wavelength-converted or the other portion of light to focus on the predetermined region.

With this, the diffractive lenses (diffractive lens array 14) enable the blue light transmitted through the phosphor layer and the yellow light resulting from the wavelength conversion in phosphor layer 11, i.e. white light, to be diffracted to focus on focusing region 15.

Here, for example, the pitch of the diffractive lenses (diffractive lens array 14) decreases from a center of microlens array 12 toward an edge of microlens array 12.

Moreover, for example, the diffractive lenses are provided on the emission face in concentric circular shapes.

Moreover, for example, the cross-section of the diffractive lenses taken along a plane perpendicular to the emission face is sawtooth-shaped.

Moreover, for example, light source 16 emits blue light as the light, and phosphor layer 11 converts a wavelength of a portion of the light into a wavelength in a wavelength range representing yellow light.

(Variations)

Diffractive lens array 14 according to the foregoing embodiment is described as being provided in a concentric circular shape, but not limited to this. Diffractive lens array 14 may be provided in a rectangular shape, or may be provided in a concentric circular shape or in a rectangular shape for each of regions.

The cross-section of diffractive lens array 14 according to the foregoing embodiment is described as being sawtooth-shaped, but not limited to this.

Figure 12:
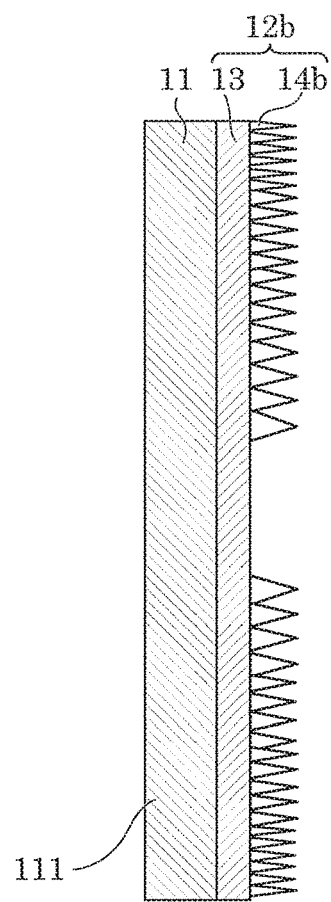
FIG. 12 is an example of a cross-sectional view of an optical member according to a variation.
Figure 13:
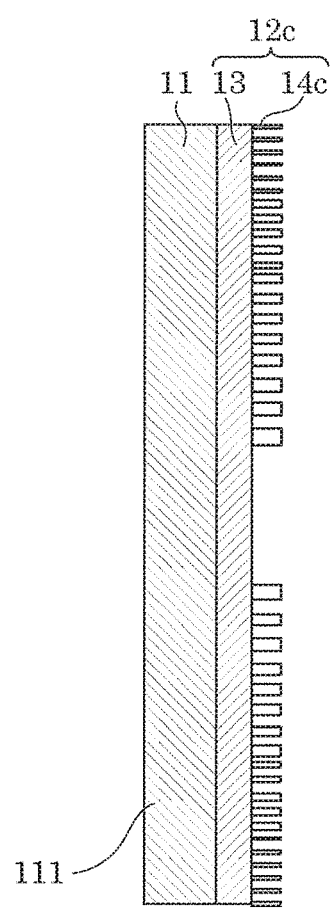
FIG. 13 is an example of a cross-sectional view of an optical member according to a variation.
Figure 14:
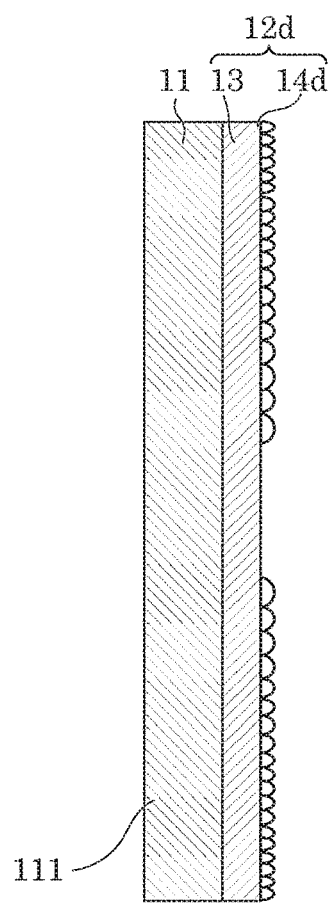
FIG. 14 is an example of a cross-sectional view of an optical member according to a variation.

FIG. 12 to FIG. 14 are each an example of the cross-sectional view of an optical member according to a variation. The same numerical reference marks are assigned to components that are the same as those in FIG. 3, etc., and detailed description thereof will be omitted.

More specifically, like microlens array 12*b* illustrated in FIG. 12, the cross-section of diffractive lens array 14*b* taken along the plane perpendicular to the emission face may be triangular-shaped. Moreover, like microlens array 12*c* illustrated in FIG. 13, the cross-section of diffractive lens array 14*c* taken along the plane perpendicular to the emission face may be rectangular-shaped. Moreover, like microlens array 12*d* illustrated in FIG. 14, the cross-section of diffractive lens array 14*d* taken along the plane perpendicular to the emission face may be semicircular-shaped. In this case, microlens array 12*d* illustrated in FIG. 14 is formed of hemispherical-shaped diffractive lenses.

It should be noted that the sawtooth shape enhances the diffraction efficiency for limited ranges of incident angle and wavelength. On the other hand, the semicircular shape, the triangular shape, or the rectangular shape is suitable for wide ranges of incident angle and wavelength.

(Other Embodiments, Etc.)

The above-described embodiment is merely one example, and various modifications, additions, and omissions are possible.

Moreover, forms realized by arbitrarily combining components and functions shown in the above-described embodiment are included in the scope of the present invention. Forms obtained by various modifications to the foregoing embodiment that can be conceived by a person of skill in the art as well as forms realized by arbitrarily combining structural components and functions in the embodiment which is within the scope of the essence of the present invention are included in the present invention.

For example, microlens array 12 may be directly formed in phosphor layer 11 to facilitate entry of light from phosphor layer 11 to diffractive lens array 14, etc. In other words, phosphor layer 11 is integrated with microlens array 12. Diffractive lens array 14 including diffractive lenses is provided on the opposite face to the incidence face of phosphor layer 11, and the opposite face serves as the emission face. In this case, the microlens array may be formed from a resin included in phosphor layer 11, or may be formed from a material having a similar refractive index as phosphor layer 11.

Moreover, in addition to optical member 10 according to the foregoing embodiment, for example, single microlens array 12 is also included in the present invention. In other words, the present invention also includes a diffractive microlens array that causes a portion of light wavelength-converted by phosphor layer 11 and the other portion of light transmitted through phosphor layer 11 to emerge from an emission face of the microlens array, the phosphor layer including a phosphor that converts a wavelength of the portion of light from light source 16 which is incident on an incidence face of phosphor layer 11, in which diffractive lens array 14 for diffracting the portion of light wavelength-converted and the other portion of light transmitted is provided on the emission face, and a pitch of diffractive lens array 14 is different for each of predetermined sections.

Forms obtained by various modifications to the foregoing embodiment that can be conceived by a person of skill in the art as well as forms realized by arbitrarily combining structural components and functions in the embodiment which is within the scope of the essence of the present invention are included in the present invention.

The invention claimed is:

1. An optical member comprising:
    a phosphor layer including a phosphor that converts a wavelength of a portion of light from a light source which is incident on an incidence face of the phosphor layer; and
    a microlens array that causes the portion of light wavelength-converted by the phosphor layer and the other portion of light transmitted through the phosphor layer to emerge from an emission face of the microlens array, the microlens array being a diffractive microlens array, wherein
    a plurality of diffractive lenses are provided on the emission face of the microlens array, the plurality of diffractive lenses being for diffracting the portion of light wavelength-converted and the other portion of light transmitted,
    a pitch of the plurality of diffractive lenses is different for each of predetermined sections,
    the pitch of the plurality of diffractive lenses belonging to some of the predetermined sections is set to be constant in each of the some of the predetermined sections to diffract the other portion of light to focus on a predetermined region, the other portion of light being in a wavelength range of the light source,
    the pitch of the plurality of diffractive lenses belonging to rest of the predetermined sections is set to be constant in each of the rest of the predetermined sections to diffract the portion of light to focus on the predetermined region, the portion of light being wavelength-converted,
    the pitch of the plurality of diffractive lenses in each of the some of the predetermined sections is different from the pitch of the plurality of diffractive lenses in each of the rest of the predetermined sections, and
    the predetermined sections are at least three in number.

2. The optical member according to claim 1, wherein
    the pitch of the plurality of diffractive lenses is set to be constant for each of the predetermined sections to diffract the portion of light wavelength-converted or the other portion of light to focus on the predetermined region.

3. The optical member according to claim 2, wherein the plurality of diffractive lenses are provided on the emission face in concentric circular shapes.

4. The optical member according to claim 1, wherein the pitch of the plurality of diffractive lenses decreases from a center of the microlens array toward an edge of the microlens array.

5. The optical member according to claim 1, wherein a cross-section of the plurality of diffractive lenses taken along a plane perpendicular to the emission face is sawtooth-shaped.

6. The optical member according to claim 1, wherein a cross-section of the plurality of diffractive lenses taken along a plane perpendicular to the emission face is rectangular-shaped.

7. The optical member according to claim 1, wherein a cross-section of the plurality of diffractive lenses taken along a plane perpendicular to the emission face is triangular-shaped.

8. The optical member according to claim 1, wherein a cross-section of the plurality of diffractive lenses taken along a plane perpendicular to the emission face is semicircular-shaped.

9. The optical member according to claim 1, wherein the light source emits blue light as the light, and the phosphor layer converts a wavelength of a portion of the light into a wavelength in a wavelength range representing yellow light.

10. The optical member according to claim 1, wherein the phosphor layer is integrated with the microlens array, the plurality of diffractive lenses are provided on an opposite face to the incidence face of the phosphor layer, and the opposite face serves as the emission face.

11. A microlens array that causes a portion of light wavelength-converted by a phosphor layer and the other portion of light transmitted through the phosphor layer to emerge from an emission face of the microlens array, the microlens array being a diffractive microlens array, the phosphor layer including a phosphor that converts a wavelength of the portion of light from a light source which is incident on an incidence face of the phosphor layer, wherein a plurality of diffractive lenses are provided on the emission face, the plurality of diffractive lenses being for diffracting the portion of light wavelength-converted and the other portion of light transmitted, a pitch of the plurality of diffractive lenses is different for each of predetermined sections, the pitch of the plurality of diffractive lenses belonging to some of the predetermined sections is set to be constant in each of the some of the predetermined sections to diffract the other portion of light to focus on a predetermined region, the other portion of light being in a wavelength range of the light source, the pitch of the plurality of diffractive lenses belonging to rest of the predetermined sections is set to be constant in each of the rest of the predetermined sections to diffract the portion of light to focus on the predetermined region, the portion of light being wavelength-converted, the pitch of the plurality of diffractive lenses in each of the some of the predetermined sections is different from the pitch of the plurality of diffractive lenses in each of the rest of the predetermined sections, and the predetermined sections are at least three in number.

* * * * *